US 8,188,189 B2

May 29, 2012

(12) United States Patent
Sogoh et al.

(10) Patent No.: US 8,188,189 B2
(45) Date of Patent: May 29, 2012

(54) RESIN COMPOSITION

(75) Inventors: Kenji Sogoh, Sodegaura (JP); Katsuhiro Yamada, Chiba (JP); Hisakatsu Hama, Ichihara (JP); Masaaki Tsutsubuchi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/988,724

(22) PCT Filed: Apr. 14, 2009

(86) PCT No.: PCT/JP2009/057812
§ 371 (c)(1),
(2), (4) Date: Oct. 20, 2010

(87) PCT Pub. No.: WO2009/131081
PCT Pub. Date: Oct. 29, 2009

(65) Prior Publication Data
US 2011/0046312 A1 Feb. 24, 2011

(30) Foreign Application Priority Data

Apr. 24, 2008 (JP) ................... 2008-113507

(51) Int. Cl.
*C08F 8/00* (2006.01)
*C08L 23/00* (2006.01)
*C08L 23/10* (2006.01)

(52) U.S. Cl. ........................ 525/191; 525/240

(58) Field of Classification Search .................. 525/191, 525/240
See application file for complete search history.

(56) References Cited

U.S. PATENT DOCUMENTS

| | | | |
|---|---|---|---|
| 5,629,254 A | 5/1997 | Fukuoka et al. | |
| 5,780,168 A * | 7/1998 | Satoh et al. | 428/516 |
| 6,084,048 A | 7/2000 | Hozumi et al. | |
| 6,160,072 A | 12/2000 | Ewen | |
| 6,252,019 B1 | 6/2001 | Ewen | |
| 6,541,123 B1 | 4/2003 | Taniguchi et al. | |
| 6,562,886 B1 | 5/2003 | Minami et al. | |
| 7,919,561 B2 * | 4/2011 | Burkhardt et al. | 525/240 |
| 2003/0208024 A1 | 11/2003 | Tatsumi et al. | |
| 2005/0043495 A1 | 2/2005 | Minami et al. | |

FOREIGN PATENT DOCUMENTS

| | | |
|---|---|---|
| JP | 06001887 A | 1/1994 |
| JP | 9048884 A | 2/1997 |
| JP | 11152313 A | 6/1999 |
| JP | 2000007731 A | 1/2000 |
| JP | 2002-020423 A | 1/2002 |

OTHER PUBLICATIONS

Int'l Search Report issued on Aug. 10, 2009 in Int'l Application No. PCT/JP2009/057812.

* cited by examiner

*Primary Examiner* — Nathan M Nutter
(74) *Attorney, Agent, or Firm* — Panitch Schwarze Belisario & Nadel LLP

(57) ABSTRACT

A resin composition, comprising (a) 50 to 99% by weight of a crystalline polypropylene resin, and (b) 1 to 50% by weight of a propylene copolymer comprising 50 to 85% by mol of a propylene unit and 15 to 50% by mol of a $C_{8-12}$ α-olefin unit, the propylene copolymer having (1) no meting point in a range of −100 to 200° C., or a melting point of 50° C. or lower in that temperature range, (2) an isotactic selectivity of 90% or higher, (3) a molecular weight distribution of 3 or smaller, and (4) an intrinsic viscosity of 0.1 to 10 dl/g.

6 Claims, No Drawings

RESIN COMPOSITION

TECHNICAL FIELD

The present invention relates to a resin composition.

BACKGROUND ART

As a resin composition containing a propylene resin and a propylene-α-olefin copolymer, JP 11-193309A (corresponding to U.S. Pat. No. 6,084,048) discloses a resin composition comprising 5 to 97% by weight of a polyolefin resin and 3 to 95% by weight of a propylene-1-butene copolymer.

DISCLOSURE OF INVENTION

However, the above resin composition is insufficient in its bleeding resistance, because a molded article of the resin composition may be smeary on its surface under high temperature.

In view of the above problem in the conventional art, the present invention has an object to provide a resin composition comprising a propylene resin and a propylene-α-olefin copolymer, and having a superior bleeding resistance.

The present invention is a resin composition, comprising (a) 50 to 99% by weight of a crystalline polypropylene resin, and (b) 1 to 50% by weight of a propylene copolymer comprising 50 to 85% by mol of a propylene unit and 15 to 50% by mol of an α-olefin unit having 8 to 12 carbon atoms, the copolymer having:

(1) no melting point in a range of −100 to 200° C., or a melting point of 50° C. or lower in that temperature range, measured according to a differential scanning calorimetry (DSC);

(2) an isotactic selectivity of 90% or higher;

(3) a molecular weight distribution of 3 or smaller; and (4) an intrinsic viscosity of 0.1 to 10 dl/g; wherein the total of the propylene unit and the α-olefin unit is 100% by mol, and the total of the crystalline polypropylene resin and the propylene copolymer is 100% by weight.

The above copolymer comprising propylene units and $C_{8-12}$ α-olefin units is hereinafter referred to as a "propylene copolymer". The above terms "propylene unit" and "α-olefin unit" mean a unit of a polymerized propylene, and a unit of a polymerized α-olefin, respectively.

BEST MODE FOR CARRYING OUT THE INVENTION

The "crystalline polypropylene resin" in the present invention means a propylene homopolymer, or a copolymer of propylene with ethylene and/or α-olefin having 4 to 10 carbon atoms. Examples of the α-olefin having 4 to 10 carbon atoms are 1-butene, 1-hexene, 1-pentene, 3-methyl-1-butene and 4-methyl-1-pentene, and a combination of two or more thereof. The crystalline polypropylene resin may be a resin known in the art, and typical examples of the crystalline polypropylene resin are a propylene homopolymer and a copolymer such as a propylene-ethylene copolymer, a propylene-1-butene copolymer, a propylene-1-hexene copolymer, a propylene-ethylene-1-butene copolymer, and a propylene-ethylene-1-hexene copolymer. Among them, preferred is a propylene homopolymer, a propylene-ethylene copolymer, or a propylene-1-butene copolymer. The crystalline polypropylene resin contains propylene units in an amount of usually 95% by mol or more, provided that the total of the crystalline polypropylene resin is 100% by mol. The above copolymer may be a random copolymer or a block copolymer, which block copolymer is not a true block copolymer containing tow or more polymer blocks chemically-linked with one another, such as a (propylene block) (ethylene block) (propylene block) block copolymer as shown in a school textbook, but an expediential polymer idiomatically referred to in a polyolefin field. For example, a propylene-ethylene block copolymer obtained by copolymerizing propylene with ethylene is not a true block copolymer, but substantially a mixture of a propylene homopolymer with an ethylene-propylene copolymer.

Examples of a steric structure of the crystalline polypropylene resin in the present invention are an isotactic structure and a syndiotatic structure, and a mixed structure of them. Among them, preferred is s a steric structure that mainly contains an isotactic structure.

Crystallinity of the crystalline polypropylene resin in the present invention is defined by a melting point, which correlates with crystallinity, and the crystalline polypropylene resin in the present invention has a melting point of 100 to usually 170° C., from a viewpoint of a heat resistance of the resin composition of the present invention. The melting point is a temperature corresponding to the highest peak observed in a DSC curve, which is obtained under the second temperature elevation of the following measuring condition in a differential scanning calorimetry (DSC):

elevating temperature from 20° C. up to 200° C. at a rate of 10° C./minute (first temperature elevation), and keeping 200° C. for 10 minutes;

lowering temperature from 200° C. down to −100° C. at a rate of 10° C./minute, and keeping −100° C. for 10 minutes; and elevating temperature from −100° C. up to 200° C. at a rate of 10° C./minute (second temperature elevation).

The crystalline polypropylene resin in the present invention has a melt flow rate of usually 0.1 to 100 g/10 minutes, measured at 230° C. under a load of 21.18 N according to JIS K7210, wherein "JIS" means Japanese Industrial Standards. The melt flow rate is preferably 0.5 g/10 minutes or larger, and more preferably 2.0 g/10 minutes or larger, in order to obtain the resin composition of the present invention superior in its moldability, and is preferably 80 g/10 minutes or smaller, and more preferably 60 g/10 minutes or smaller, in order to obtain the resin composition of the present invention superior in its mechanical strength.

The crystalline polypropylene resin in the present invention can be produced according to a polymerization method known in the art, using a polymerization catalyst such as Ziegler-Natta catalyst and a metallocene catalyst. Examples of the polymerization method are a solution polymerization method, a bulk polymerization method, a slurry polymerization method, and a gas-phase polymerization method, and a combined polymerization method of two or more thereof.

Examples of the $C_{8-12}$ α-olefin regarding the propylene copolymer used in the present invention are 1-octene, 1-nonene, 1-decene, 1-undecene and 1-dodecene, and a combination of two or more thereof. Among them, preferred is 1-octene, 1-decene or 1-dodecene.

The propylene copolymer used in the present invention contains a propylene unit in an amount of 50 to 85% by mol, and preferably 60 to 80% by mol, and a $C_{8-12}$ α-olefin unit in an amount of 15 to 50% by mol, and preferably 20 to 40% by mol, provided that the total of both units is 100% by mol. When the amount of the propylene unit is larger than 85% by mol, the resin composition of the present invention may be less flexible. When the amount of the propylene unit is smaller than 50% by mol, the resin composition of the present invention may be less transparent. The respective amounts of both units contained in the propylene copolymer are measured according to a $^{13}$C-NMR ($^{13}$Carbon-Nuclear Magnetic Resonance) method.

The propylene copolymer used in the present invention has no meting point in a range of −100 to 200° C., or has a melting point of 50° C. or lower in that temperature range, measured according to a differential scanning calorimetry (DSC). From a viewpoint of superior flexibility of the resin composition of the present invention, the propylene copolymer used in the present invention preferably has no meting point in that temperature range, or has a melting point of 45° C. or lower in that temperature range, and more preferably has no melting point in that temperature range. The melting point is also a temperature corresponding to the highest peak observed in a DSC curve, which is measured according to the same method as that mentioned above.

The propylene copolymer used in the present invention has an isotactic selectivity of 90% or higher, preferably 93% or higher, and more preferably 95% or higher. When the isotactic selectivity is lower than 90%, the resin composition of the present invention may be poor in its bleeding resistance. The isotactic selectivity is a degree of an isotactic structure of a polymer chain formed by propylene units contained in the propylene copolymer, and is represented by a ratio of an "intensity of a signal assigned to an isotactic structure" to an "intensity of a signal assigned to a tertiary carbon atom linked with a methyl group in propylene unit", both signals being measured according to a $^{13}$C-NMR method. The above former signal (numerator) is usually observed between 21.2 to 22.5 ppm, and the above latter signal (denominator) is usually observed between 19.5 to 22.5 ppm. The isotactic selectivity is calculated by the following formula:

Isotactic selectivity (%)=100×[integrated value for signal between 21.2 to 22.5 ppm]/[integrated value for signal between 19.5 to 22.5 ppm].

The propylene copolymer used in the present invention has a molecular weight distribution (Mw/Mn) of 3 or smaller, preferably 2.5 or smaller, and more preferably 2.0 or smaller, Mw and Mn being a weight average molecular weight and a number average molecular weight, respectively, measured according to a gel permeation chromatography (GPC). When the Mw/Mn value is larger than 3, the resin composition of the present invention may be poor in its bleeding resistance.

The propylene copolymer used in the present invention has an intrinsic viscosity of 0.1 to 10 dl/g, preferably 0.3 to 5 dl/g, and more preferably 0.5 to 3 dl/g. When the intrinsic viscosity is smaller than 0.1 dl/g, the resin composition of the present invention may be poor in its bleeding resistance, and when the intrinsic viscosity is larger than 10 dl/g, the resin composition of the present invention may be poor in its kneading ability.

The propylene copolymer used in the present invention may be known in the art. Examples of the propylene copolymer are a propylene-1-octene copolymer, a propylene-1-nonene copolymer, a propylene-1-decene copolymer, a propylene-1-undecene copolymer, and a propylene-1-dodecene copolymer. Among them, preferred is a propylene-1-octene copolymer, a propylene-1-decene copolymer, or a propylene-1-dodecene copolymer.

A process for producing the propylene copolymer used in the present invention may be known in the art. A preferable process for producing the propylene copolymer comprises the step of polymerizing propylene, a $C_{8-12}$ α-olefin and other optional monomer in the presence of a polymerization catalyst formed by contacting a transition metal compound mentioned hereinafter with a cocatalyst component mentioned hereinafter.

Examples of the above transition metal compound are rac-dimethylsilylene-bis(2-methyl-4-phenylindenyl)zirconium dichloride, rac-dimethylsilylene-bis(2-methyl-5,6-benzoindenyl) zirconium dichloride, rac-ethylenebisindenylzirconium dichloride, rac-dimethylsilylene-bis(2-methyl-4-phenylindenyl)titanium dichloride, rac-dimethylsilylene-bis(2-methyl-5,6-benzoindenyl)titanium dichloride, rac-ethylenebisindenyltitanium dichloride, rac-dimethylsilylene-bis(2-methyl-4-phenylindenyl)hafnium dichloride, rac-dimethylsilylene-bis(2-methyl-5,6-benzoindenyl)hafnium dichloride, and rac-ethylenebisindenylhafnium dichloride. Those transition metal compounds can be produced by a process known in the art, such as a process disclosed in JP 6-100579A (corresponding to U.S. Pat. No. 5,770,753).

Examples of the above cocatalyst component are organoaluminumoxy compounds such as tetramethyldialuminoxane, tetraethyldialuminoxane, tetrabutyldialuminoxane, tetrahexyldialuminoxane, methylaluminoxane, ethylaluminoxane, butylaluminoxane, isobutylaluminoxane, and hexylaluminoxane; and boron compounds such as tris(pentafluorophenyl)borane, triphenylcarbenium tetrakis(pentafluorophenyl)borate, tri(n-butyl)ammonium tetrakis(pentafluorophenyl)borate, and N,N-dimethylanilinium tetrakis(pentafluorophenyl)borate.

Examples of a polymerization method for producing the propylene copolymer used in the present invention are a solution polymerization method, a bulk polymerization method, a slurry polymerization method, and a gas phase polymerization method, and a combined method of two or more thereof, those polymerization methods being all known in the art, and a batch-wise method or a continuous method. Polymerization conditions for those polymerization methods may be known in the art, and for example, polymerization temperature is usually 30 to 150° C., polymerization pressure is usually ordinary pressure to 5 MPa, and polymerization time is 10 minutes to 12 hours.

The resin composition of the present invention contains the crystalline propylene resin in an amount of 50 to 99% by weight, preferably 60 to 95% by weight, and more preferably 70 to 90% by weight, and the propylene copolymer in an amount of 1 to 50% by weight, preferably 5 to 40% by weight, and more preferably 10 to 30% by weight, provided that the total of the crystalline propylene resin and the propylene copolymer is 100% by weight. When the amount of the crystalline propylene resin is larger than 99% by weight, the resin composition of the present invention may be less flexible, and when the amount of the crystalline propylene resin is smaller than 50% by weight, the resin composition of the present invention may be poor in its heat resistance.

The crystalline propylene resin and/or propylene copolymer may be used in combination with one or more kinds of additive agents known in the art. Examples of the additive agent are antioxidizing agents, weather-resistant agents, lubricants, antiblocking agents, antistatic agents, antifog agents, antidrip agents, pigments, and fillers.

The crystalline propylene resin and/or propylene copolymer may also be used in combination with one or more kinds of other polymers known in the art, such as polyethylene resins such as a high-density polyethylene, a middle-density polyethylene, a low-density polyethylene, a linear low-density polyethylene; polybutene resins; poly-4-methylpentene resins; polystyrene resins; polymethyl methacrylate resins; polyester resins; polyamide resins; polyphenylene ether resins; polyacetal resins; and polycarbonate resins. When combining, the resin composition of the present invention contains the total of the crystalline propylene resin and the propylene copolymer in an amount of 80% by weight or larger, and preferably 90% by weight or larger, provided that the total of the crystalline propylene resin, the propylene copolymer, and one or more kinds of other polymers known in the art is 100% by weight.

An example of a method for producing the resin composition of the present invention is a method comprising the steps of (1) dry-blending the crystalline propylene resin, the propylene copolymer, and one or more kinds of other optional components such as additive agents and other polymers as mentioned above, in a mixing apparatus such as a tumbler-blender and a Henschel-mixer, thereby forming a blend, and (2) melt-kneading the blend in an extruder such as a uniaxial extruder and a multiaxial extruder, or in a kneading machine such as a kneader and a Banbury mixer.

The present invention is explained with reference to the following Example, and the scope of the present invention is not limited thereto.

EXAMPLE 1

1. Preparation of Propylene Copolymer

There were charged (i) 467 mL of 1-octene ($C_8$ α-olefin) manufactured by Tokyo Chemical Industry Co., Ltd., and previously dehydrated by active alumina NKHD24 manufactured b Sumitomo Chemical Co., Ltd. and MOLECULAR SIEVES 13X manufactured by Union Showa K.K., and (ii) 1.0 kg of hexane (solvent) manufactured by Sumitomo Chemical Co., Ltd. into a 5 liter autoclave previously purged with an argon gas. Stirring the autoclave at a room temperature, 400 g of propylene manufactured by Sumitomo Chemical Co., Ltd. was charged into the autoclave, and then the autoclave was heated up to 60° C. Into the autoclave, (i) 5.9 mL of a hexane solution of triisobutylaluminum (cocatalyst component) having a concentration of 0.33 mol/L and manufactured by Tosoh-finechem, (ii) 2.8 mL of a hexane slurry of rac-dimethylsilylene-bis(2-methyl-4-phenylindenyl)zirconium dichloride (transition metal compound) having a concentration of 1 mg/3 mL, and then (iii) 13.3 mL of a hexane slurry of N,N-dimethylanilinium tetrakis(pentafluorophenyl)borate having a concentration of 1.13 mmol/L and manufactured by Asahi Glass Co., Ltd. were charged in this order, thereby initiating and continuing polymerization of propylene with 1-octene at 60° C. under stirring. When the polymerization was continued for 3 hours, 5 mL of ethanol was charged in to the autoclave, thereby terminating the polymerization.

Hydrochloric acid was added to the polymerization reaction mixture at 30° C. The resultant mixture was allowed to stand, thereby dividing the organic phase from the aqueous phase. The organic phase was separated from the aqueous phase, thereby obtaining the organic phase. In order to wash the organic phase with water, water was added to the organic phase, and the obtained mixture was allowed to stand to separate the organic phase from the aqueous phase, thereby obtaining the organic phase. The above water washing was further carried out two times. The finally obtained organic phase was added to acetone to precipitate a copolymer. The copolymer was dried under a reduced pressure, thereby obtaining 180 g of a propylene-1-octene copolymer (propylene copolymer).

The propylene-1-octene copolymer was found to contain 21% by mol of a 1-octene unit, and 79% by mol of a propylene unit, and was found to have no melting point, a glass transition temperature of −29.3° C., an isotactic selectivity of 100%, a molecular weight distribution (Mw/Mn) of 2.0, and an intrinsic viscosity of 1.2 dl/g. Results are shown in Table 1.

2. Preparation of Resin Composition

There were kneaded 10 parts by weight of the above propylene-1-octene copolymer, and 90 parts by weight of a propylene-ethylene copolymer manufactured by Sumitomo Chemical Co., Ltd. and having a trade name of NOBLENE S131, a melting point of 133° C., and a melt flow rate of 1.5 g/10 minutes, using a batch-wise kneader manufactured by Brabender OHG, at 220° C. for 5 minutes at a rotor rotating speed of 100 rpm, thereby obtaining a resin composition. The resin composition was found to have transparence of 12.2%, and a bleeding resistance of 1.8%. Results are shown in Table 2.

COMPARATIVE EXAMPLE 1

1. Preparation of Propylene Copolymer

Example 1 was repeated except that (1) the amount of 1-ocetene was changed to 311 mL, (2) the amount of hexane was changed to 1.1 kg, (3) rac-dimethylsilylene-bis(2-methyl-4-phenylindenyl)zirconium dichloride was changed to 0.92 mL of a hexane solution of diethylsilylene(tetramethylcyclopentadienyl(3-tert-butyl-5-methyl-2-phenoxy)titanium dichloride (transition metal compound) having a concentration of 1 mg/1 mL, and (4) the amount of the hexane slurry of N,N-dimethylanilinium tetrakis(pentafluorophenyl)borate was changed to 9.0 mL, thereby obtaining 172 g of a propylene-1-octene copolymer (propylene copolymer).

The propylene-1-octene copolymer was fond to contain 11% by mol of a 1-octene unit, and 89% by mol of a propylene unit (the total of both units being 100% by mol), and was found to have no melting point, a glass transition temperature of −18.8° C., an isotactic selectivity of 12%, a molecular weight distribution (Mw/Mn) of 1.9, and an intrinsic viscosity of 2.6 dl/g. Results are shown in Table 1.

2. Preparation of Resin Composition

Example 1 was repeated except that the propylene-1-octene copolymer was changed to the propylene-1-octene copolymer obtained in the above section 1, thereby obtaining a resin composition. The resin composition was found to have transparence of 12.1%, and a bleeding resistance of 8.6%. Results are shown in Table 2.

The above content of a 1-octene unit, 11% by mol, was calculated according to the following formula:

content of 1-octene unit (% by mol)=100×$C/(C+D)$ wherein C is an integrated value for signals in a range of 22.0 to 24.0 ppm of an NMR spectrum, and D is an integrated value for signals in a range of 14.5 to 22.0 ppm of an NMR spectrum, those spectra being measured according to a $^{13}$C-NMR method, under the following conditions, NMR apparatus of ARX600 manufactured by Bruker Corporation,
    mixed solvent of 4 parts by volume of orthodichlorobenzene and 1 part by volume of orthodichlorobenzene-$d_4$,
    temperature of 408K,
    Powergate Decoupling method,
    pulse angle of 45 degree, and
    reference material of tetramethylsilane.

The above melting point and glass transition temperature (° C.) were measured according to a differential scanning calorimetry (DSC) using an equipment, SSC-5200, manufactured by Seiko Instruments & Electronics Ltd. under the following conditions:
heating from 20° C. to 200° C. at a temperature-increasing rate of 10° C./minute, and keeping at 200° C. for 10 minutes; then,
cooling from 200° C. to −100° C. at a temperature-decreasing rate of 10° C./minute, and keeping at −100° C. for 10 minutes; and then,
measuring a melting point or glass transition temperature under heating from −100° C. to 200° C. at a temperature-increasing rate of 10° C./minute.

The above isotactic selectivity (%) was calculated by the following formula:

Isotactic selectivity (%)=100×[integrated value for signal between 21.2 to 22.5 ppm of NMR spectrum]/[integrated value for signal between 19.5 to 22.5 ppm of NMR spectrum], those NMR spectra being measured according to a $^{13}$C-NMR method, under the same conditions as the above conditions for measuring the content of a 1-octene unit.

The above molecular weight distribution is defined as a ratio of a weight average molecular weight (Mw) to a number average molecular weight (Mn), and Mw and Mn were measured according to a gel permeation chromatography (GPC) under the following conditions:
GPC equipment of Waters 150C manufactured by Waters Corporation;
separation column of TOSOH TSK gel (GMH6-HT) manufactured by Tosoh Corporation;
measurement temperature of 140° C.;
carrier of orthodichlorobenzene;
flow rate of 1.0 mL/minute;
injection volume of 500 μL;
differential refractometer detector; and
calibration curve prepared using standard polystyrenes.

The above intrinsic viscosity ([η], dl/g) was measured at 135° C. in tetrahydronaphthalene as a solvent using an Ubbelohde viscometer.

The above transparence (%) was obtained by measuring a haze according to JIS K7105 of a 1 mm-thick sheet press-molded at 230° C. according to JIS K7151.

The above bleeding resistance (%) was obtained by a method comprising the steps:
(1) heating the above sheet (having a haze of $H_0$) at 60° C. for 24 hours;
(2) measuring a haze (H) of the heat-treated sheet; and
(3) calculating a difference (ΔH) between $H_0$ and H;
ΔH expressed in percentage being the above bleeding resistance, and the smaller ΔH is, the more superior a bleeding resistance is.

The above melt flow rate (MFR: g/10 minutes) was measured at 230° C. under a load of 21.18 N according to JIS K7210.

INDUSTRIAL APPLICABILITY

The resin composition of the present invention is superior in its bleeding resistance, and is also good in its flexibility and transparency. The resin composition of the present invention can be molded into molded articles such as films and sheets, according to a molding method known in the art, such as an extrusion molding method (for example, blown film molding method and T-die film molding method), a blow molding method, an injection molding method, and a compression molding method. Those molded articles can be applied to uses such as sheets for building materials, hoses and tubes.

TABLE 1

| | Propylene-1-octene copolymer | |
| --- | --- | --- |
| | Example 1 | Comparative Example 1 |
| Amount of 1-octene unit (% by mol) | 21 | 11 |
| Melting point (° C.) | not observed | not observed |
| Glass transition temperature (° C.) | −29.3 | −18.8 |
| Isotactic selectivity (%) | 100 | 12 |
| Molecular weight distribution | 2.0 | 1.9 |
| Intrinsic viscosity (dl/g) | 1.2 | 2.3 |

TABLE 2

| | Example 1 | Comparative Example 1 |
| --- | --- | --- |
| Transparency (%) | 12.2 | 12.1 |
| Bleeding resistance (%) | 1.8 | 8.6 |

The invention claimed is:

1. A resin composition, comprising (a) 50 to 99% by weight of a crystalline polypropylene resin, and (b) 1 to 50% by weight of a propylene copolymer comprising 50 to 85% by mol of a propylene unit and 15 to 50% by mol of an α-olefin unit having 8 to 12 carbon atoms, the propylene copolymer having:
(1) no melting point in a range of −100 to 200° C., measured according to a differential scanning calorimetry (DSC);
(2) an isotactic selectivity of 90% or higher;
(3) a molecular weight distribution of 3 or smaller; and
(4) an intrinsic viscosity of 0.1 to 10 dl/g;
wherein the total of the propylene unit and the α-olefin unit is 100% by mol, and the total of the crystalline polypropylene resin and the propylene copolymer is 100% by weight.

2. The resin composition according to claim 1, wherein the crystalline polypropylene resin is a propylene homopolymer, a propylene-ethylene copolymer, or a propylene-1-butene copolymer, the crystalline polypropylene resin containing propylene units in an amount of 95% by mol or more, provided that the total of the crystalline polypropylene resin is 100% by mol.

3. The resin composition according to claim 1, wherein the crystalline polypropylene resin has an isotactic structure.

4. The resin composition according to claim 1, wherein the crystalline polypropylene resin has a melting point of 100 to 170° C.

5. The resin composition according to claim 1, wherein the crystalline polypropylene resin has a melt flow rate of 0.1 to 100 g/10 minutes, measured at 230° C. under a load of 21.18 N according to JIS K7210.

6. The resin composition according to claim 1, wherein the α-olefin unit having 8 to 12 carbon atoms is a 1-octene unit, a 1-decene unit or a 1-dodecene unit.

* * * * *